March 14, 1939.     D. S. MUZZEY, JR     2,150,517

ELECTRICAL EXPLORATION METHOD

Filed July 29, 1938

Inventor: David Saville Muzzey Jr.
By his Attorney:

Patented Mar. 14, 1939

2,150,517

UNITED STATES PATENT OFFICE 2,150,517

ELECTRICAL EXPLORATION METHOD

David Saville Muzzey, Jr., Houston, Tex., assignor to Shell Development Company, San Francisco, Calif., a corporation of Delaware Application July 29, 1938, Serial No. 221,983

4 Claims. (Cl. 175—182)

This invention pertains to electrical methods of ground exploration, and relates more specifically to a method whereby surfaces of discontinuity between formation layers may be located by observing rectification effects occurring at such surfaces when alternating currents are passed through the ground.

It is known that electric conduction in the ground is largely of electrolytic nature. It follows that at surfaces of discontinuity within the earth polarization phenomena will accompany the passage of an alternating current. A partial rectification of said current will therefore take place and a unidirectional potential difference will be set up across any electrolytic discontinuity through which the alternating current passes. Direct currents will flow from this surface as a source, the energy to maintain them being supplied by the alternating current.

It is, therefore, the object of this invention to provide a method for exploring at the surface of the earth the direct current potential field caused by the rectification of the applied alternating current, whereby a plane of discontinuity may be located in a simpler and more direct way than by the usual method of resistivity determinations.

It is another object of this invention to provide a method whereby the so-called natural ground potential generated between the potential electrodes may be balanced out or neutralized.

It is another object of this invention to provide a method whereby the drift in the value of said natural ground potential may be determined and the measurements corrected for said drift.

It is another object of this invention to provide a method whereby any direct current potential set up by polarization effects occurring at the current electrodes is prevented from affecting the measurements taken between potential electrodes.

It is a further object of this invention to provide a method whereby the alternating current flowing through the current electrodes and tending to pass into the circuit of the potential electrodes may be effectively balanced out of said circuit.

These and other objects of this invention, as well as the arrangement of apparatus used in practicing the same, will be understood from the following description, taken with reference to the attached drawing, wherein.

Figure 1:
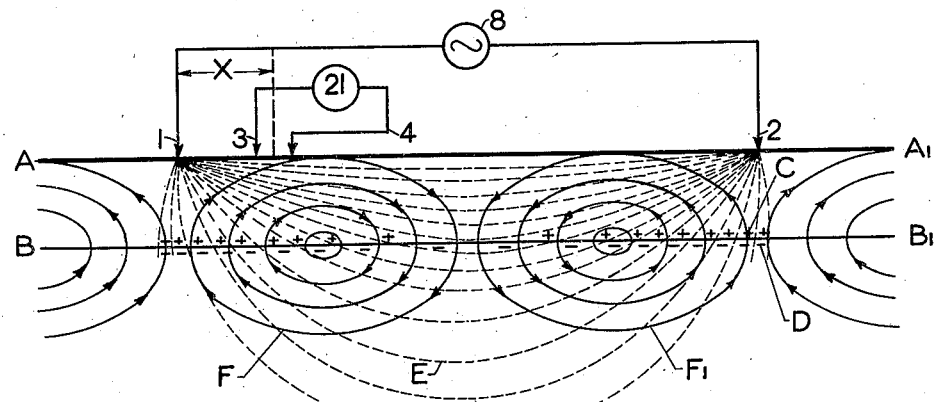
Fig. 1 is a diagrammatic vertical cross-section taken through the surface of the ground, showing a plane of discontinuity parallel to said surface, and indicating schematically the distribution and flow direction of the direct current due to rectification of the alternating current passing through said discontinuity plane.

Referring to Fig. 1, line B—B₁ represents an idealized plane of discontinuity parallel to the surface of the ground A—A₁ and separating two formation layers having different electrolytic properties. I and 2 are grounded current electrodes connected to the terminals of an alternator 8, supplying current to the ground. The lines E show qualitatively the paths of the alternating current in the ground in a case where the plane of discontinuity B—B₁ does not produce any abrupt change in the current distribution from that obtaining in a uniform ground. The polarization occurring at the plane B—B₁ due to the passage of the alternating current is indicated by the positive and negative signs C and D, arbitrarily placed on the upper and the lower side of the plane, respectively. The lines F and F₁ indicate qualitatively the paths of the direct current resulting from the rectification occurring at the plane B—B₁, the arrows on said lines showing the direction of flow.

Figure 2:
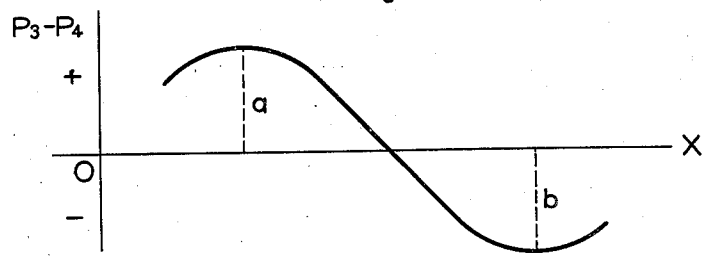
Fig. 2 shows a curve obtained by plotting the values of the rectification potentials measured between the potential electrodes against the mean distance of said electrodes from one of the current electrodes.

If the probing electrodes 3 and 4 are applied to the surface A—A₁, and are moved in steps in the direction from the current electrode I towards the current electrode 2, the distance between electrodes 3 and 4 being kept constant, and the potential difference therebetween is measured at each step by means of a suitable indicating device 21, the results obtained may be plotted to give the curve of Fig. 2.

In Fig. 2, the abscissa represents the distance from the current electrode I to the center of the space between the probing electrodes 3 and 4, and the ordinates represent the differences in potential between the electrodes 3 and 4, that is, the quantity ($P_3-P_4$). The potential differences represented by the curve of Fig. 2 are caused by the surface of discontinuity B—B₁ alone. If this surface of discontinuity were not present, the potential difference ($P_3-P_4$) would be zero for all values of $x$, if the rectification effect taking place at the electrodes is discounted or corrected for. The amplitude and position of peaks a and b of the curve with respect to the electrodes 1 and 2 indicate respectively the depth and the slope, if any, of the plane of discontinuity B—B1.

The method of the present invention, as applied in the field, consists in causing a relatively large alternating current to flow in a tract of ground, allowing it to be partially rectified at a surface of discontinuity, and measuring the direct current potential difference resulting therefrom between suitably chosen points on the surface, while eliminating as far as possible the effect on the measurements of both the natural ground potential and the rectification occurring at the electrodes.

Two electrodes may be used to send the alternating current into the ground, although a greater number, such as three or more, may sometimes be used, for example, according to the method described in the copending application Serial No. 147,060, filed on June 8, 1937, by H. M. Evjen. The current electrodes should be suitably spaced to obtain the desired penetration for a sufficient fraction of the current into the ground, and the frequency of the current should be sufficiently low to eliminate or minimize the skin effect in the ground tending to prevent the desired penetration.

For measuring the rectified D. C. potential difference between the potential electrodes, a potentiometer arrangement may be advantageously used, so that at balance little or no current will be drawn from these electrodes. The indicating galvanometer used with this potentiometer should be a D. C. instrument not affected by alternating current.

When two spaced electrodes, for example, the potential electrodes, are placed in the ground, a D. C. potential difference may arise between them because of the different electrolytic nature of the ground at the two locations. To eliminate this natural ground potential from the measurement of the rectified potential, the potentiometer setting giving a zero reading on the galvanometer may be recorded with and without the alternating current being passed through the ground, the difference in setting giving a measure of the rectification effect.

It must be noted that a rectification effect due to the electrolytic properties of the ground will also occur at the current electrodes. In the current circuit, the rectification at the two electrodes will oppose each other, but since the two electrodes will not in general be in exactly similar ground, there will be a net rectified direct current in the current circuit. This will produce a potential difference at the potential electrodes which will increase or decrease the potential difference due to the rectification at the ground discontinuity. When the potential electrodes are moved systematically to locate the source of the rectification, in the manner described above, the net rectification occurring at the current electrodes can generally be recognized as such and the results may be corrected for it, or, if the frequency used is sufficiently high, condensers may be used in the current circuit to prevent the flow of the direct current due to the rectification of the alternating current at the current electrodes, whereby the necessity of correcting for this spurious rectification is eliminated.

There will also be a rectification at the potential electrodes if any of the alternating current flowing through the ground is allowed to pass into the potential circuit. In order to eliminate or minimize this effect below any perceptible value, the potential circuit may be inductively coupled to the current circuit in such a manner that a small alternating potential of adjustable amplitude and phase may be induced in the potential circuit and adjusted to oppose the alternating current tending to flow between the potential electrodes. An A. C. detector which is not affected by direct current may be included in the potential circuit to indicate the desired condition of null alternating current.

Figure 3:
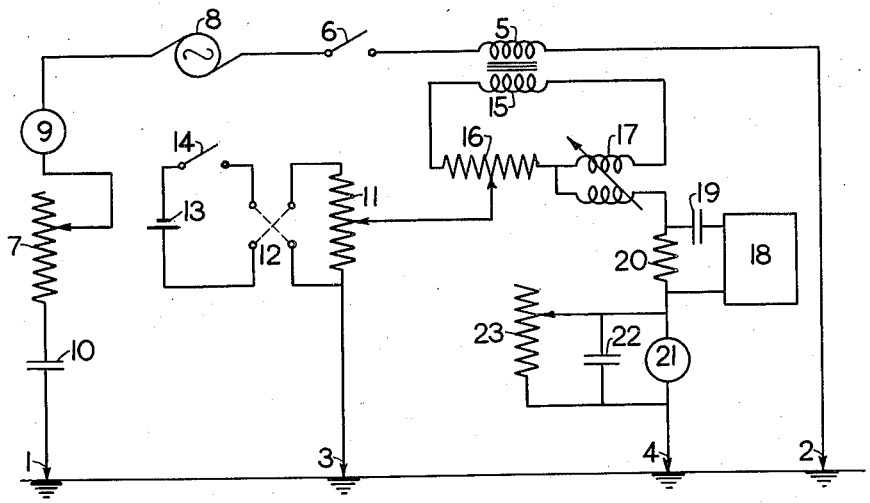
Fig. 3 is a diagram showing the arrangement of apparatus used in practicing the present invention.

With the foregoing in mind, a suitable apparatus for carrying out the method of the present invention is diagrammatically shown in Fig. 3, and comprises a current and a potential circuits.

The current circuit comprises the current electrodes 1 and 2, between which the alternating current is passed through the ground, a source of alternating current 8, a switch 6, a transformer primary 5, an ammeter 9, a rheostat 7 and a condenser 10, which may, however, be omitted when the frequency used is so low as to make its necessary size impracticable.

The potential circuit comprises the potential electrodes 3 and 4, a calibrated potential divider 11, a potential divider 16, a variometer 17, a resistance 20, and a direct current galvanometer 21.

A source of known potential 13, in series with a switch 14, is connected by means of a reversing switch 12 to the potential divider 11, thus forming a calibrated potentiometer circuit.

A circuit for balancing out the alternating potential picked up by the potential electrodes is formed by the potential divider 16, the variometer 17, and the secondary of the transformer 15 of the current circuit.

A sensitive alternating current detecting device 18, which may consist of one or more stages of vacuum tube amplification terminating in a copper oxide rectifier instrument, is coupled through a condenser 19 to a resistance 20 in the potential circuit.

The direct-current galvanometer 21 is shunted by a condenser 22, to by-pass the alternating current, and by a rheostat 23 to vary its sensitivity.

In carrying out the method of the present invention, the following procedure may be followed:

With the electrodes 1, 2, 3 and 4 grounded in the desired positions, the span between the current electrodes being preferably considerably in excess of that between the potential electrodes, the natural ground potential is first balanced out of the potential circuit. For this purpose, the switch 14 is closed, the reversing switch 12 is thrown to the proper position, and the potential divider 11 is adjusted until the galvanometer 21 is brought to a zero reading, with the rheostat 23 preferably at its maximum resistance setting to give galvanometer 21 a maximum sensitivity.

Switch 6 is then closed, allowing the alternating current from the generator 8 to flow through the ground between the electrodes 1 and 2. The current is read by means of ammeter 9, and may be adjusted, if desired, to some desired value by means of rheostat 7.

The potential divider 16 and the variometer 17 are then adjusted to bring the reading of the alternating current detector 18 to zero, indicating that the alternating current between electrodes 3 and 4 has been balanced out.

If the galvanometer 21 now shows a reading different from zero, it is brought back to a zero reading by changing the setting of the potential divider 11, and this change in the setting of the potential divider 11 is observed and recorded. Provided that the natural ground potential has remained constant during these operations, this change in the observed setting of the potential divider 11 is a measure of the direct current potential difference between electrodes 3 and 4 due to the rectification at the discontinuity plane B—B₁.

To ascertain whether the natural ground potential has changed during these operations, the switch 6 is reopened, and galvanometer 21 is brought back to zero reading by making the necessary readjustment of the potential divider 11. If the setting of the potential divider 11 is now not the same as it was to give a zero galvanometer reading before closing the switch 6, this shows that the natural ground potential has changed or drifted, and the process of opening and closing switch 6 must be repeated at known time intervals while recording the settings of the potential divider 11 which bring the galvanometer 21 to a zero reading with the switch 6 alternately open and closed. By plotting this series of readings of potential divider 11 settings against time, the drift of the natural ground potential may be readily determined, and the true value of the rectified potential difference between electrodes 3 and 4 ascertained with accuracy.

The electrodes 3 and 4 are then moved in steps from electrode 1 towards electrode 2, the spacing therebetween being kept constant, and the same electrical measurements are carried out at each step or stage. The results obtained may be plotted in the form of a curve such as shown in Fig. 2.

The spacing between electrodes may generally vary between 25 and 1000 feet or more. It should be noted that in moving the electrodes 3 and 4 in the direction from electrode 1 towards electrode 2, the distance over which they may be moved is not necessarily limited to the span between electrodes 1 and 2, but may extend beyond the latter, rectification effects being also perceptible therein, as shown in Fig. 1. The frequencies used should preferably be of the order of from 1 to 60 cycles per second.

It is apparent that the electrodes used in carrying out the process of this invention should cause only as small and as steady a natural ground potential as possible to appear between them, and should also produce as little rectification of the alternating current passing through them as possible. Copper-copper sulfate porous pot electrodes, as well as other improved types of electrodes known to the art may be advantageously used for this purpose.

I claim as my invention:

1. In a method for the electrical exploration of ground strata having different electrolytic properties, the steps of passing through the ground an alternating current, allowing said alternating current to be partially rectified at surfaces of discontinuity between said strata, and observing the direct current potential difference generated in the ground by said rectification.

2. In a method for the electrical exploration of ground strata having different electrolytic properties by means of a system comprising current electrodes and potential electrodes, the steps of passing through the ground an alternating current between the grounded current electrodes, allowing said alternating current to be partially rectified at surfaces of discontinuity between said strata, moving the grounded potential electrodes by steps in the direction from one current electrode towards the other while maintaining a constant spacing therebetween, and observing at each step the direct current potential difference generated between the potential electrodes by the rectification of the alternating current in the ground.

3. In a method for the electrical exploration of ground strata having different electrolytic properties by means of a system comprising grounded current electrodes in circuit with a source of alternating current, and grounded potential electrodes in circuit with a direct current registering device and an adjustably variable source of direct current potential, the steps of indicating on said registering device the natural ground potential difference between the potential electrodes, reducing the reading of said registering device to zero by adjusting the variable source of potential, passing an alternating current through the ground between the current electrodes, allowing said alternating current to be partially rectified at the surfaces of discontinuity between said strata, indicating on said registering device the potential difference generated between the potential electrodes by said rectification, again reducing the reading of said device to zero by adjusting the variable source of potential, and determining the magnitude of the rectification potential from the amount of adjustment of the variable source of potential necessary to maintain the registering device at zero.

4. In a method for the electrical exploration of ground strata having different electrolytic properties by means of a system comprising grounded current electrodes in circuit with a source of alternating current, grounded potential electrodes in circuit with a direct current registering device and an adjustably variable source of direct current potential, and adjustable means for inductively coupling the circuit of the current electrodes to the circuit of the potential electrodes, the steps of indicating on the registering device the natural ground potential difference between the potential electrodes, reducing the reading of said registering device to zero by adjusting the variable source of potential, passing alternating current through the ground between the current electrodes, neutralizing the alternating current tending to pass into the circuit of the potential electrodes by adjusting the means inductively coupling the circuits of the current and of the potential electrodes, allowing the alternating current in the ground to be partially rectified at the surfaces of discontinuity between the strata, indicating on the registering device the potential difference generated between the potential electrodes by said rectification, again reducing the reading of said device to zero by adjusting the variable source of potential, and determining the magnitude of the rectification potential from the amount of adjustment of the variable source of potential necessary to maintain the registering device at zero reading.

DAVID SAVILLE MUZZEY, Jr.